United States Patent [19]
Scott

[11] Patent Number: 5,997,066
[45] Date of Patent: Dec. 7, 1999

[54] ENCLOSURE FOR AN EXTENDED TAILGATE

[75] Inventor: Kevin D. Scott, Hickory, Pa.

[73] Assignee: Kevin Duane Scott, Hickory, Pa.

[21] Appl. No.: 09/036,730

[22] Filed: Mar. 9, 1998

[51] Int. Cl.⁶ .................................................. B62D 33/02
[52] U.S. Cl. ...................................... 296/26.08; 296/57.1
[58] Field of Search ............................. 296/26.08, 26.11, 296/57.1; 224/403–405

[56] References Cited

U.S. PATENT DOCUMENTS

| | | | |
|---|---|---|---|
| 4,472,639 | 9/1984 | Bianchi | 296/26.11 |
| 5,700,047 | 12/1997 | Leitner et al. | 296/2.11 |
| 5,755,480 | 5/1998 | Bryan | 96/57.1 |
| 5,775,759 | 7/1998 | Cummins | 296/26.11 |
| 5,806,907 | 9/1998 | Martinus et al. | 296/26.11 |
| 5,820,188 | 10/1998 | Nash | 296/26.11 |
| 5,823,596 | 10/1998 | Kulesza | 296/26.08 |

Primary Examiner—Dennis H. Pedder

[57] ABSTRACT

A central panel has two ends. Two side panels are connected to the central panel such that each of the ends of the central panel is pivotally attached to an edge of one of the side panels. Each of the side panels includes a latch attachment member attached thereto. The side panels are rotatable toward a folded position against the central panel. The enclosure is adapted to be fixed to a tailgate when the tailgate is extended horizontally outward from a truck bed, such that the central panel extends along a long edge of the tailgate, the side panels extend along opposite short edges of the tailgate, and each of the latch attachment members engages a latch of the tailgate.

1 Claim, 3 Drawing Sheets

ENCLOSURE FOR AN EXTENDED TAILGATE

BACKGROUND OF THE INVENTION

1. Field of the Invention

The present invention relates to accessories for pickup trucks, particularly to devices which attach to tailgates.

2. Description of the Related Art

Truck owners sometimes extend their tailgates to a horizontally extended position, to extend the usable length of the truck bed when carrying long loads. The problem with this approach is that the back end of the extended bed is no longer enclosed, and loads have to be carefully tied down and carefully watched to make sure that they don't fall out of the truck bed.

What is needed is a device which encloses the extended bed when the tailgate is lowered to a horizontally extended position, for safer carrying of long loads.

SUMMARY OF THE INVENTION

The enclosure for an extended tailgate of the present invention includes a central panel having two ends. Two side panels are connected to the central panel such that each of the ends of the central panel is pivotally attached to an edge of one of the side panels. Each of the side panels includes a latch attachment member attached thereto. The side panels are rotatable toward a folded position against the central panel.

The enclosure is adapted to be fixed to a tailgate when the tailgate is extended horizontally outward from a truck bed, such that the central panel extends along a long edge of the tailgate, the side panels extend along opposite short edges of the tailgate, and each of the latch attachment members engages a latch of the tailgate.

Because the latch members engage a latch of the tailgate, the enclosure remains securely affixed to the tailgate without any additional fastening hardware being required.

Still further features and advantages will become apparent from the ensuing description and drawings.

DETAILED DESCRIPTION

Figure 1:
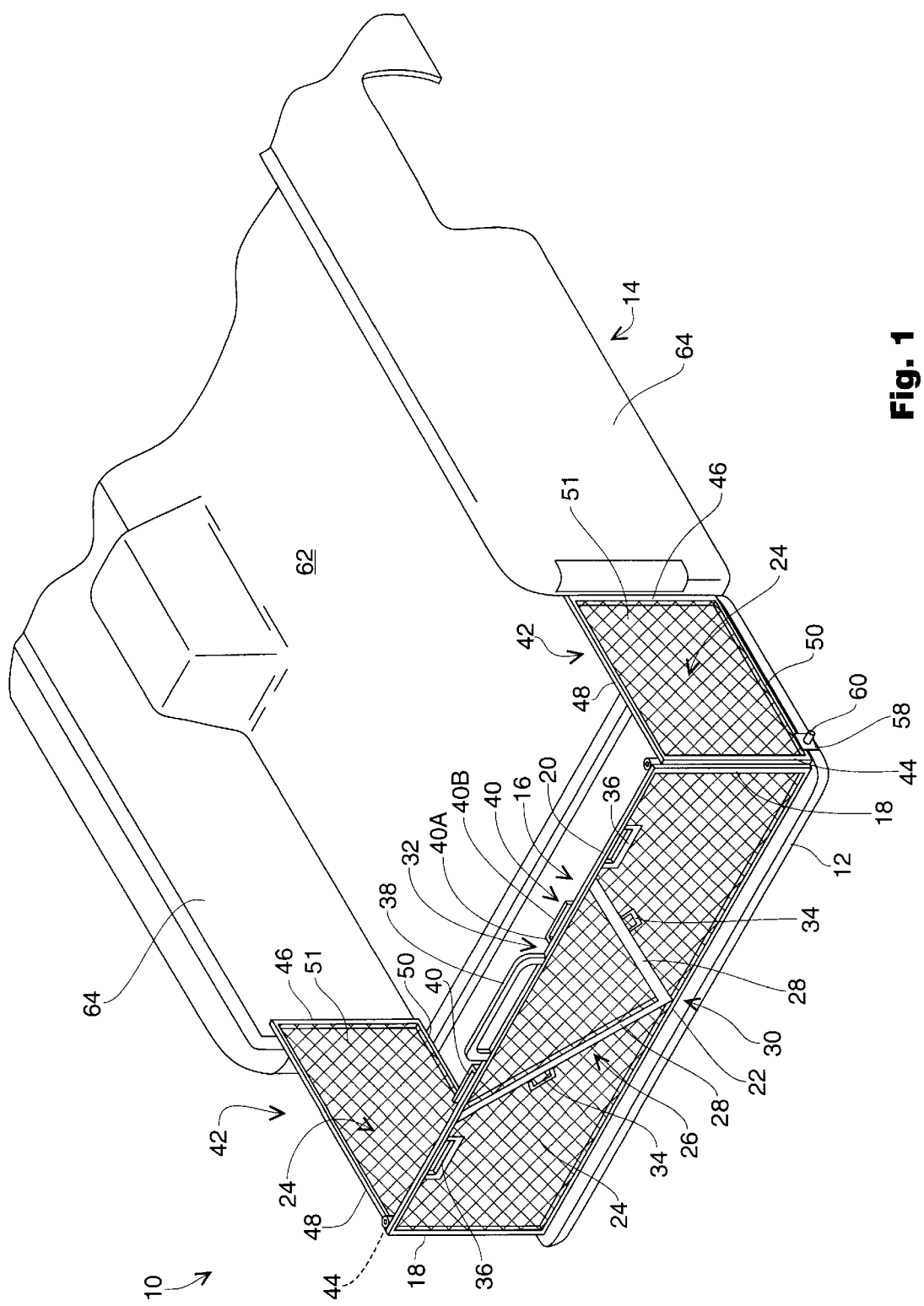
FIG. 1 is a partial perspective view of an enclosure of the present invention connected to an extended tailgate of a pickup truck.

FIG. 1 is a partial perspective view of an enclosure 10 of the present invention connected to an extended tailgate 12 of a pickup truck 14. The enclosure 10 includes a rectangular central panel 16 comprising two elongated central panel side frame members 18, an elongated first central panel end frame member 20, and an elongated second central panel end frame member 22.

A screen 24 is connected to and extends between the central panel side frame members 18, the first central panel end frame member 20 and the second central panel end frame member 22. A V-shaped support member 26 is centrally disposed on the central panel 16. The support member 26 has two legs 28 and forms an apex 30 and an open end 32. The apex 30 of the support member 26 is connected to the second central panel end frame member 22, and the open end 32 of the support member 26 is connected to the first central panel end frame member 20.

Each of the legs 28 of the support member 26 has a support member handle 34 connected thereto. A pair of hanging slots 36 are disposed proximate the first central panel end frame member 20, and proximate the central panel side frame members 18. A first central panel end frame handle 38 is disposed centrally on the first central panel end frame member 20.

A pair of L-shaped latch members 40 each have a short leg 40A and a long leg 40B. The long leg 40B is disposed parallel to the central panel 16. The short leg 40A is connected to and disposed perpendicular to the first central panel end frame member 20. The long leg 40B is pivotal about a longitudinal axis of the short leg 40A.

The enclosure 10 further includes two rectangular side panels 42. Each of the side panels 42 includes an elongated first side panel side frame member 44, an elongated second side panel side frame member 46, an elongated first side panel end frame member 48, and an elongated second side panel end frame member 50. A side panel screen 51 extends between the members 46, 48, 50.

Each of the side panels 42 is connected to the central panel 16 such that each of the central panel side frame members 18 is pivotally attached to one of the first side panel side frame members 44. The side panels 42 and pivotal connections to the central panel 16 may be configured in a conventional manner to limit the swing of the side panels 42 such that they will not form an angle of greater than 90 degrees with the central panel 16.

Figure 2:
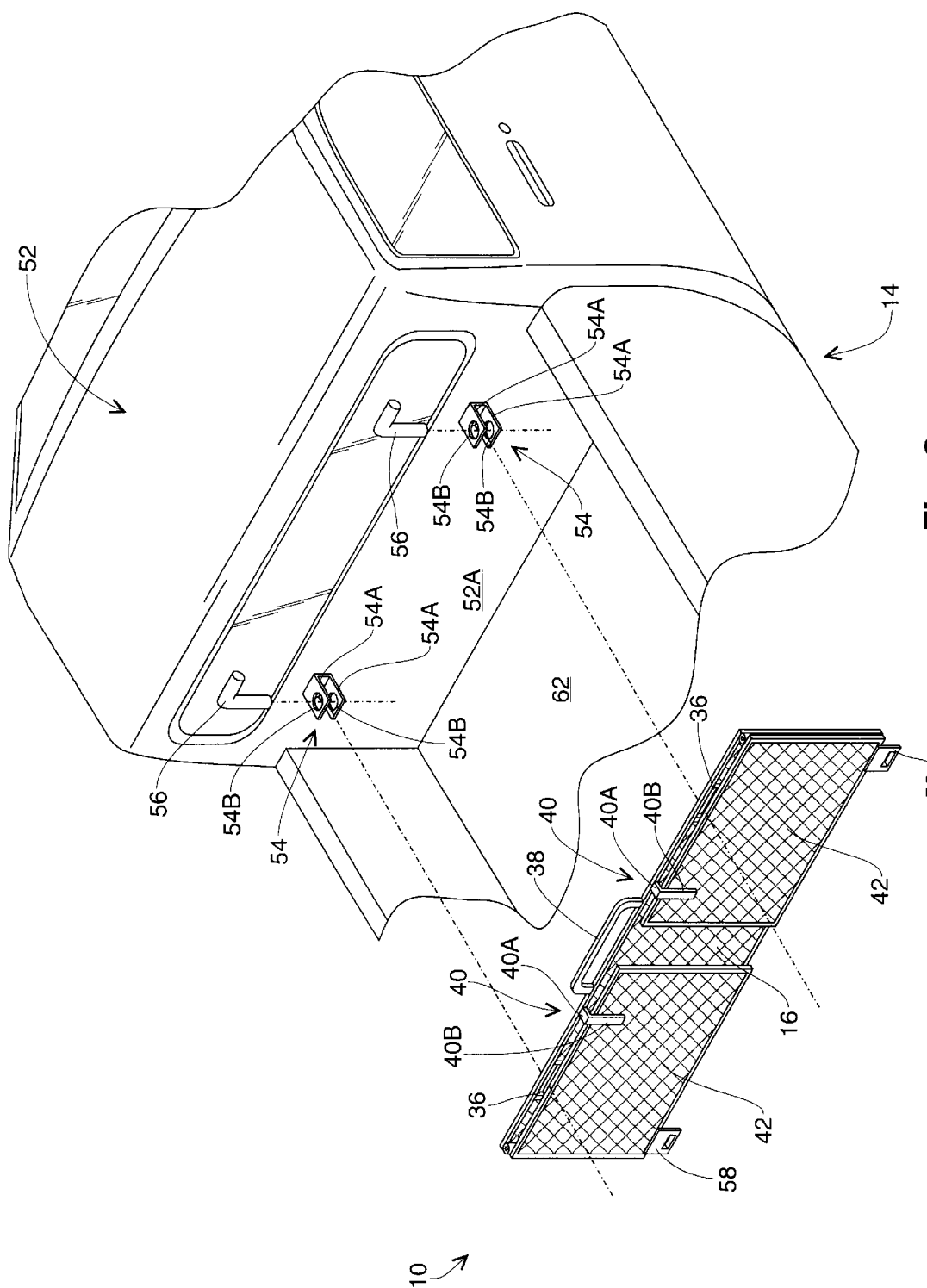
FIG. 2 is an exploded partial perspective view showing the structure for hanging the enclosure on a back of a cab of the pickup truck when the enclosure is not in use.

FIG. 2 is an exploded partial perspective view showing the structure for hanging the enclosure 10 on a back 52A of a cab 52 of the pickup truck 14 when the enclosure 10 is not in use. The side panels 42 are rotatable toward a folded position against the central panel 16 as shown in FIG. 2. The latch members 40 are configured to secure the side panels 42 in the folded position.

Two U-shaped brackets 54 are attached to the back 52A of the cab 52 such that legs 54A of the brackets 54 stick outwardly from the cab 52. The legs 54A each include apertures 54B there-through. When the enclosure 10 is not in use, the enclosure 10 is secured to the cab 52 in the folded position by passing lower ones of the legs 54A through the hanging slots 36, and then passing securing pins 56 through the apertures 54B such that the enclosure 10 is captured between the cab 52 and the securing pins 56.

Figure 3:
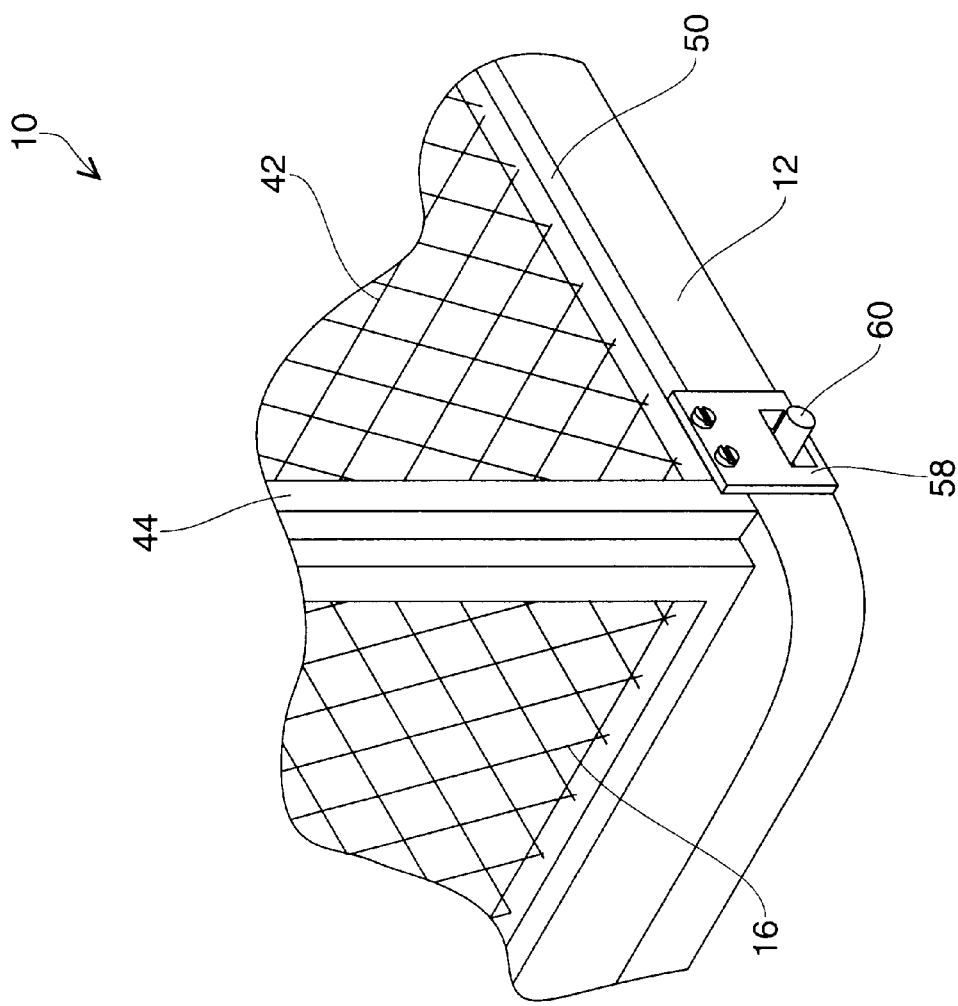
FIG. 3 is a an enlarged partial perspective view of the enclosure.

FIG. 3 is an enlarged partial perspective view of the enclosure 10. Referring primarily to FIGS. 1 and 3, a latch attachment member 58 is attached to the second side panel end frame member 50, proximate the first side panel side frame member 44. The latch attachment member 58 is a slotted plate configured to receive a latch member 60 of the tailgate 12. The latch member 60 is conventionally a bar which is configured to extend outwardly from the tailgate 12 when a handle (not show) of the tailgate 12 is released, and is normally provided for locking the tailgate 12 in an upright position.

Referring primarily to FIG. 1, the enclosure 10 is adapted to be fixed to the tailgate 12 when the tailgate 12 is extended horizontally outward from a truck bed 62, such that the second central panel end frame member 22 rests against the tailgate 12 along a long edge of the tailgate 12, the second side panel end frame members 50 of the side panels 42 rest against the tailgate 12 along opposite short edges of the tailgate 12, and each of the latch attachment members 58 engagaes the latch member 60 of the tailgate 12. The side panels 42 extend inward past the truck walls 64, helping to maintain the enclosure 10 securely in position.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention; for example, the screen 24 and the side panel screens 51 may be replaced by solid panels. Accordingly, the scope of the invention is to be limited only by the following claims and their legal equivalents.

The invention claimed is:

1. An enclosure for an extended tailgate comprising:
   a. a rectangular central panel comprising:
      i. two elongated central panel side frame members;
      ii. an elongated first central panel end frame member;
      iii. an elongated second central panel end frame member;
      iv. a screen connected to and extending between the central panel side frame members, the first central panel end frame member, and the second central panel end frame member;
      v. a V-shaped support member centrally disposed on the central panel, the support member having two legs and forming an apex and an open end, the apex of the support member connected to the second central panel end frame member, and the open end of the support member connected to the first central panel end frame member;
      vi. each of the legs of the support member having a support member handle connected thereto;
      vii. a pair of hanging slots disposed proximate the first central panel end frame member, each of the central panel side frame members having one of the hanging slots disposed proximate thereto;
      iii. a first central panel end frame handle disposed centrally on the first central panel end frame member; and
      ix. a pair of L-shaped latch members, each latch member having a short leg and a long leg, the long leg disposed parallel to the central panel and the short leg connected to and disposed perpendicular to the first central panel end frame member, the long leg being pivotal about a longitudinal axis of the short leg;
   b. two rectangular side panels, each of the side panels comprising:
      i. an elongated first side panel side frame member;
      ii. an elongated second side panel side frame member;
      iii. an elongated first side panel end frame member;
      iv. an elongated second side panel end frame member; and
      v. a latch attachment member disposed proximate the first side panel side frame member and the second side panel end frame member;
   c. each of the side panels connected to the central panel such that each of the central panel side frame members is pivotally attached to one of the first side panel side frame members;
   d. the side panels being rotatable toward a folded position against the central panel, and the latch members configured to secure the side panels in the folded position; and
   e. the enclosure adapted to be fixed to a tailgate when the tailgate is extended horizontally outward from a truck bed, such that the second central panel end frame member rests against the tailgate along a long edge of the tailgate, the second side panel end frame members of the side panels rest against the tailgate along opposite short edges of the tailgate, and each of the latch attachment members engages a latch member of the tailgate.

* * * * *